*INVENTOR.*
GIANNI A. DOTTO
BY
*ATTORNEY*

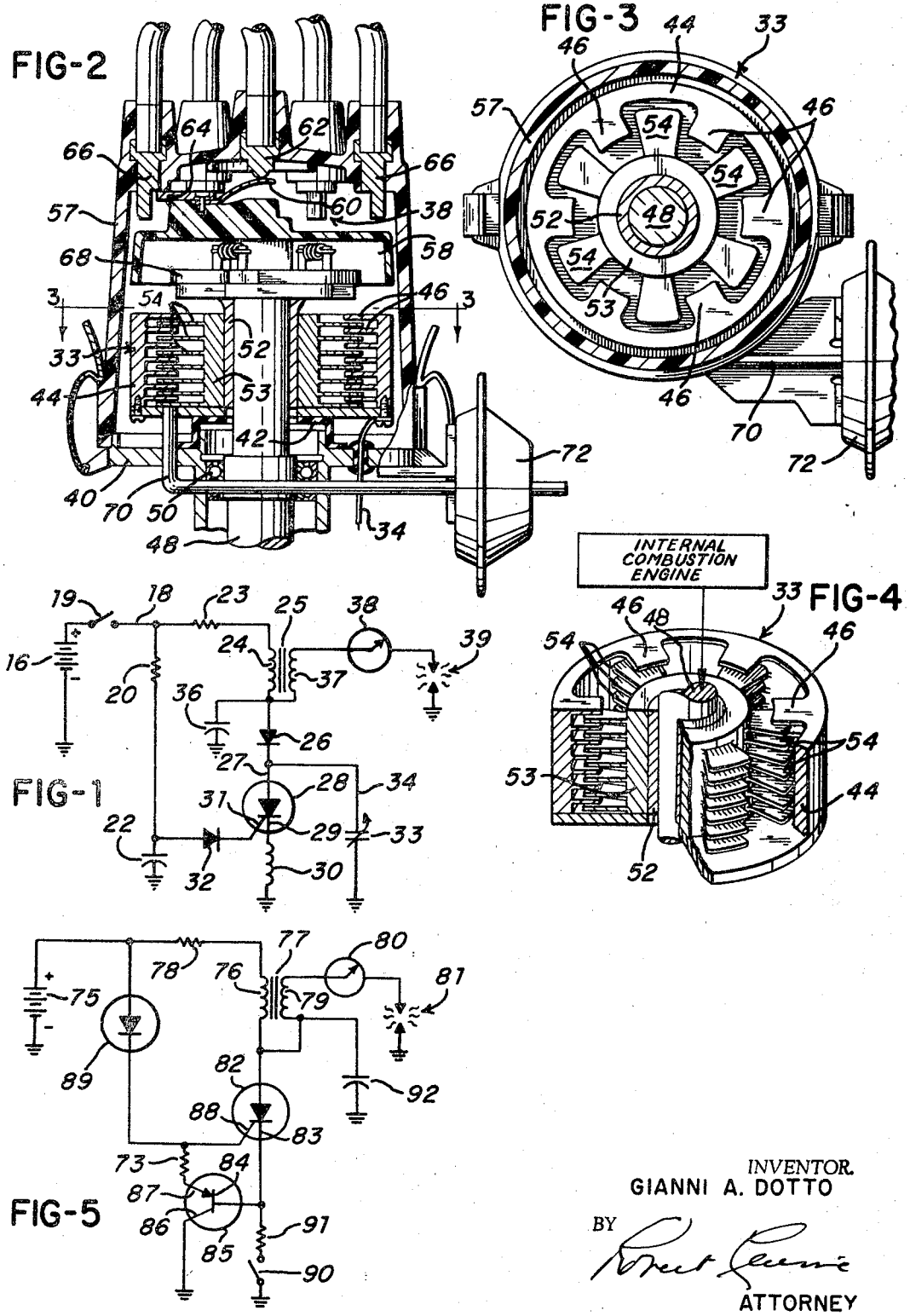

April 8, 1969  G. A. DOTTO  3,437,876
AUTOMOTIVE SEMICONDUCTOR IGNITION CONTROL APPARATUS
Original Filed July 12, 1962  Sheet 3 of 4
FIG-12
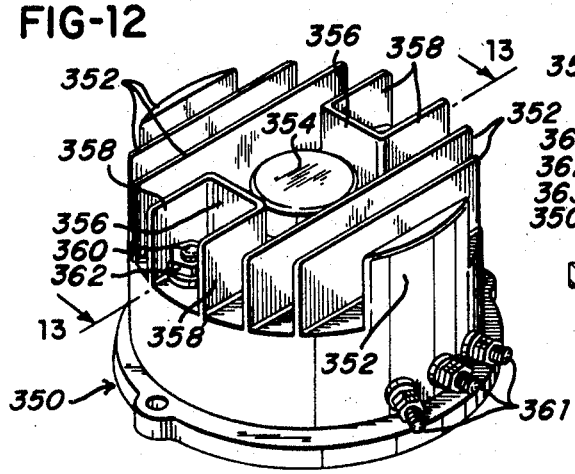
FIG-13
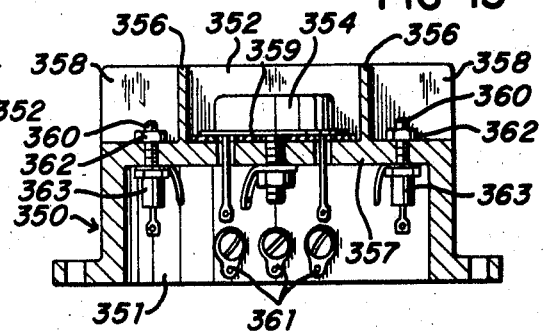
FIG-11
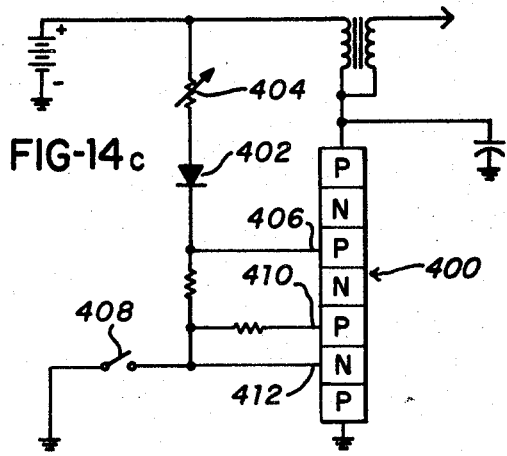
FIG-14a
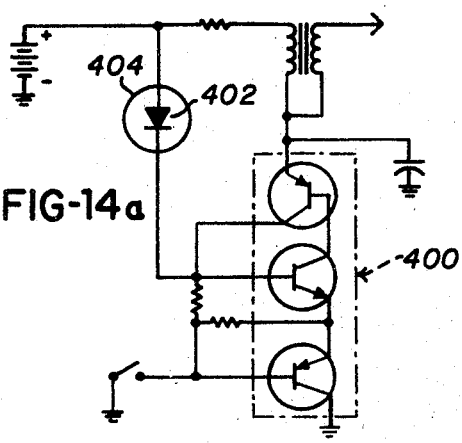
FIG-14b
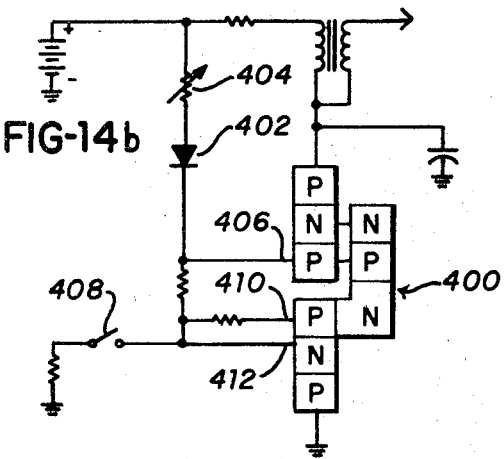
FIG-14c
INVENTOR.
GIANNI A. DOTTO
BY
ATTORNEY

INVENTOR.
GIANNI A. DOTTO
BY
ATTORNEY

United States Patent Office 3,437,876
Patented Apr. 8, 1969

---

3,437,876
AUTOMOTIVE SEMICONDUCTOR IGNITION CONTROL APPARATUS
Gianni A. Dotto, 3005 Claar Ave., Dayton, Ohio 45429
Original application July 12, 1962, Ser. No. 209,402, now Patent No. 3,217,316, dated Nov. 9, 1965. Divided and this application June 3, 1965, Ser. No. 473,542
Int. Cl. H05b 37/02, 41/36
U.S. Cl. 315—219                23 Claims

ABSTRACT OF THE DISCLOSURE

A semiconductor ignition apparatus including semiconductor means and a rotary capacitance means and inductance means wherein the rotary capacitor means and the inductance means cooperates to apply a determined value of reverse voltage to the semiconductor means when the capacitance value of the rotary capacitor means attains a determined value the semiconductor means is biased to nonconduction.

---

This is a division of U.S. Ser. No. 209,402, filed July 12, 1962.

This invention relates to automotive apparatus. The invention relates more particularly to ignition control apparatus for an internal combustion engine.

It is an object of this invention to provide ignition control apparatus by which higher efficiency operation of an internal combustion engine can be obtained than is possible with any known ignition control system.

Another object of this invention is to provide ignition control apparatus which provides consistent operation in the production of a high voltage, high current spark in a combustion chamber of an internal combustion engine during any speed or load in the engine operation.

Another object of this invention is to provide ignition control apparatus which thus makes possible a very small amount of waste gases from the exhaust of the engine.

Another object of this invention is to provide circuit means by which a silicon controlled rectifier can be employed as a switching member in a circuit having an inductive load capable of producing high energy values.

Another object of this invention is to provide ignition apparatus which has a minimum number of moving parts and which has a minimum number of parts which are subject to wear or the like.

Another object of this invention is to provide such ignition apparatus which can be produced at relatively low cost.

Other objects and advantages reside in the construction of parts, the combination thereof, the method of manufacture, and the mode of operation, as will become more apparent from the following description.

Figure 15A:
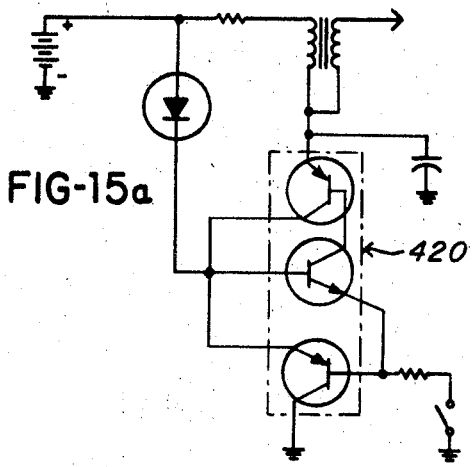
Figure 15B:
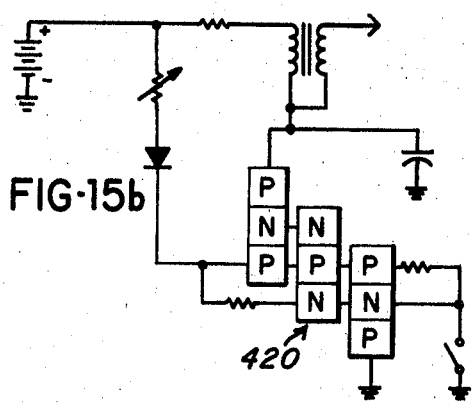
Figure 15C:
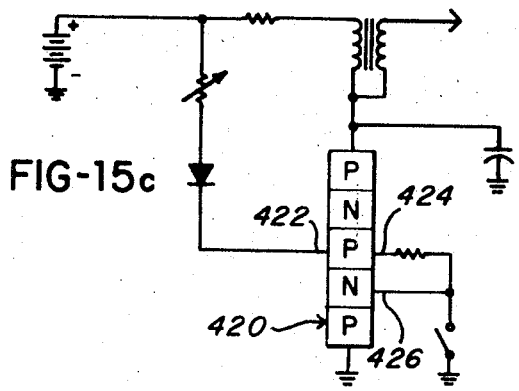
Figure 16:
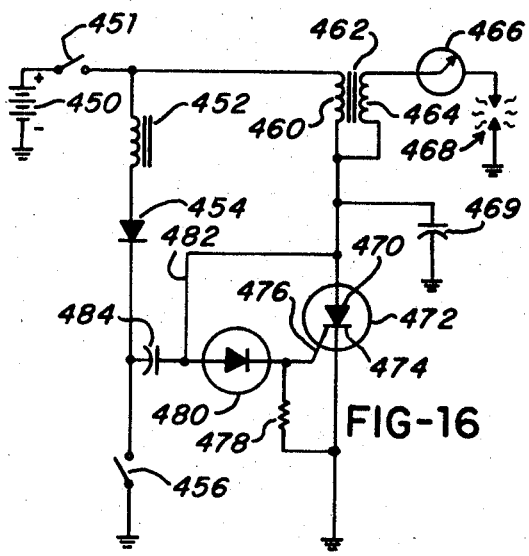

In the drawings:
FIGURE 1 is a schematic diagram of ignition control apparatus of this invention.
FIGURE 2 is a sectional view of rotary capacitor apparatus of this invention.
FIGURE 3 is a sectional view taken substantially on line 3—3 of FIGURE 2.
FIGURE 4 is a fragmentary perspective view of a portion of rotary capacitor apparatus of this invention.
FIGURES 5, 6, 7, 8, 9, and 10 are schematic wiring diagrams of modifications of ignition control apparatus of this invention.
FIGURE 11 is a plan view of control switch mechanism of this invention.
FIGURE 12 is a perspective view of support and housing structure of ignition control apparatus of this invention.
FIGURE 13 is a sectional view taken substantially on line 13—13 of FIGURE 12.
FIGURES 14a, 14b, and 14c illustrate the use of a new semiconductor device in ignition control apparatus of this invention. FIGURE 14c shows a circuit of this invention using a new semiconductor device. FIGURE 14b illustrates the construction of the new semiconductor device, and FIGURE 14a illustrates the analogy between the new semiconductor device and a combination of transistors.
FIGURES 15a, 15b, and 15c illustrate the use of a new semiconductor device in ignition control apparatus of this invention. FIGURE 15c shows a circuit of this invention using a new semiconductor device. FIGURE 15b illustrates the construction of the new semiconductor device, and FIGURE 15a illustrates the analogy between the new semiconductor device and a combination of transistors.
FIGURE 16 is a schematic wiring diagram of another modification of the ignition control apparatus of this invention.

Referring to the drawings in detail, the apparatus of FIGURE 1 is illustrated as including a battery 16, which is ordinarily the conventional power supply battery of an automobile. The negative side of the battery 16 is shown as being grounded. The positive side of the battery 16 is connected by means of a conductor 18 to a resistor 20. An ignition switch 19 is shown in the conductor 18. The resistor 20 is connected in series with a capacitor 22 which is connected to ground. Thus, the series of the capacitor 22 and the resistor 20 is connected across the battery 16. Also, connected to the conductor 18 is a ballast resistor or impedance member 23 to which is series connected a primary winding 24 of an ignition coil or transformer 25. The ignition coil 25 may be a conventional ignition coil used in a present day ignition system. A diode 26 is shown as being connected to the primary winding 24. The diode 26 is also connected to an anode 27 of a controlled rectifier 28.

The controlled rectifier 28 is preferably of a known type of semiconductor device referred to as a silicon controlled rectifier, ordinarily consisting of a plurality of successive zones, usually four zones, of alternate P and N material, there being a junction separating adjoining zones.

The controlled rectifier 28 has a cathode 29 at the end thereof opposite the anode 27. The cathode 29 is connected to ground through an inductance element or impedance member or coil 30. The controlled rectifier 28 also has an intermediate junction or control electrode or gate 31. The controlled rectifier 28 is of the type which is ordinarily initiated into a conductive state by passing a given value of current through the gate 31. However, after conduction of current through the device is begun, the current continues to flow therethrough until the current decreases below a certain holding current value or until the voltage across the controlled rectifier is reversed.

Connected to the juncture between the resistor 20 and the capacitor 22 is a diode 32 which also is connected to the gate 31.

A rotary capacitor 33, discussed below, is connected by means of a conductor 34 to the anode 27 of the controlled rectifier 28. The rotary capacitor 33 is also connected to ground.

A capacitor 36 is shown connecting the primary winding 24 of the ignition coil or transformer 25 to ground. The capacitor 36 may be a capacitor used in a conventional ignition system.

The ignition coil 25 may be of a conventional type and has a secondary winding 37 which is shown as being joined to the primary winding 24 and to the capacitor 36. The primary winding 24 and the secondary winding 37 of the ignition coil or transformer 25 are wound on a common core. The secondary winding 37 connects through any suitable distributor mechanism 38 to a spark plug 39 or to any other suitable element having a desired spark gap within a combustion chamber of an internal combustion engine. The distributor mechanism 38 is further discussed below. The spark plug 39 is also connected to ground in a conventional manner.

The rotary capacitor

The rotary capacitor, referred to by numeral 33, is shown structurally in FIGURES 2, 3, and 4. The rotary capacitor 33 is adapted to replace a conventional breaker point switch mechanism in a conventional ignition system. The rotary capacitor 33 has a frame 40 which, by means of an insulating support member 42, supports an elongate annular member 44 which has a plurality of inwardly extending plates 46. The plates 46 are preferably arranged in equally spaced-apart stacks around the inner wall of the member 44, as shown in FIGURE 3. Each stack of plates 46 extends axially within the annular member 44. The plates 46 in each stack thereof are aligned and spaced-apart, as shown in FIGURE 4.

A rotary shaft 48, journalled within a bearing 50, rotatably supports a sleeve 52. Secured to the sleeve 52 and rotatable therewith is a hub 53 which carries a plurality of stacks of plates 54, so that there is one plate 54 movable between two plates 46 in each of the stacks thereof. The number of stacks of plates 46 and of plates 54 is shown as being equal. However, the number of stacks of plates 46 may be greater or smaller than the number of stacks of plates 54. Preferably, the number of stacks of plates 46 and the number of stacks of plates 54 is in a given ratio to the number of combustion chambers of the internal combustion engine with which the apparatus is associated.

The shaft 48 is adapted to be attached to suitable mechanism of the engine for rotative movement therewith. Herein, the shaft 48 provides the ground connection of the rotary capacitor 33. However, connection may be made in any other suitable manner. The conductor 34 is connected to the annular member 44 and, as discussed above, is connected to the anode 27 of the silicon controlled rectifier 28.

A cover member 57 has at the upper portion thereof the distributor mechanism 38, mentioned above. An insulated carrier member 58 is attached to the shaft 48 for rotation therewith adjacent the upper portion of the cover member 57. The carrier member 58 supports a contact member 60 which resiliently engages a center stud 62. The contact member 60 also has a tip 64 which moves to closely spaced relationship with any one of a plurality of studs 66 to provide a circuit therewith. Each of the studs 66 connects to one of the cylinders of the engine for distribution of high voltage thereto from the secondary winding 37 of the ignition coil 25.

Also, attached to the shaft 48 is a conventional type of centrifugally operated mechanical advance mechanism 68 which rotates the hub 53 slightly with respect to the shaft 48 when a given speed of rotation of the shaft 48 is obtained. Connected to the annular member 44 is a rod 70 of a conventional type of vacuum advance mechanism 72.

When the ignition switch 19 is closed, current passes through the resistor or impedance member 20 and charges the capacitor 22. The time required for charging the capacitor 22 is, of course, determined by the values of the resistor 20 and the capacitor 22. After the capacitor 22 is charged to a predetermined degree, there is a flow of current of a predetermined amount through the diode 32 and through the gate 31 of the controlled rectifier 28. This current flow causes the controlled rectifier to assume a conductive state and to conduct current therethrough. Thus, current flows through the primary winding 24 of the ignition coil 25, through the diode 26, through the controlled rectifier 28, and through the inductance element or coil 30.

This flow of current begins when the rotary capacitor 33 has the rotary plates 54 thereof in the positions shown in FIGURE 3. However, with operation of the engine to which the shaft 48 of the rotary capacitor 33 is connected, the shaft 48 rotates and moves the stacks of plates 54 to positions within the stacks of plates 46, as shown in FIGURE 4. When such position of the plates 54 is obtained, the maximum capacitance of the rotary capacitor is obtained.

Preferably, the coil 30 and the rotary capacitor 33 are constructed so that the inductive reactance of the coil 30 is equal to the capacitive reactance of the rotary capacitor 33. Therefore, as the plates 54 approach the positions thereof as shown in FIGURE 4, an oscillatory current of considerable value is established between the rotary capacitor 33 and the coil 30. As such oscillatory current is established between the coil 30 and the rotary capacitor 33, such oscillatory current flows through the controlled rectifier device 28.

As stated above, one method of stopping conduction of current through a controlled rectifier device, such as the device 28, is that of applying a reverse voltage across the device. Thus, within a cycle after the oscillatory current is established, a half cycle of voltage occurs across the controlled rectifier 28 which is opposite to the normal voltage thereacross. Such voltage in the reverse direction instantaneously causes the controlled rectifier device 28 to become nonconductive.

With the use of the diode 26 which is in series with the controlled rectifier 28 and which is connected to the capacitor 33, a greater voltage charge is created upon the capacitor 33 than would otherwise be possible. This is a result of the choke action of the winding 24 "held" by the diode 26. This causes a very rapid response of the tank circuit action of the capacitor 33 and the coil 30 to make the controlled rectifier 28 nonconductive when the capacitor 33 approaches its maximum capacity position as shown in FIGURE 4.

As the circuit through the controlled rectifier 28 is instantaneously opened, there is a sudden collapse of the magnetic field in the core of the ignition coil 25 and a high voltage is induced in the secondary winding 37. This high voltage in the secondary winding 37 causes a spark across the spark gap of the spark plug 39 which is connected to the secondary winding 37 through the distributor mechanism 38.

It is to be understood that the shaft 48 of the rotary capacitor 33 continuously rotates with operation of the engine to which the apparatus of this invention is associated. The shaft 48 of the rotary capacitor 33 continues to rotate and the plates 46 and 54 again appear as shown in FIGURE 3. The shaft 48 continues to rotate so that the plates 46 and 54 again appear in the manner shown in FIGURE 4 as the distributor mechanism 38 moves to initiate firing in another cylinder of the engine.

FIGURE 5

The apparatus of this invention as shown in FIGURE 5 comprises a battery 75 which is connected to a primary winding 76 of an ignition coil 77 by means of a ballast resistor 78. The ignition coil or transformer 77 has a secondary winding 79. The secondary winding 79 is connected by any suitable distributor means 80 to spark gap means 81 which is also connected to ground. A controlled rectifier 82 is connected in series with the primary winding 76 of the ignition coil or transformer. The controlled rectifier 82 has a cathode 83 connected to a base 84 of a transistor 85. The transistor 85 has a collector 86 connected to ground. The transistor 85 has an emitter 87 connected by means of a resistor 73 to a gate 88 of the controlled rectifier 82. The gate 88 of the controlled rectifier 82 is connected to the battery 75 through a diode 89.

The diode 89 is preferably of a type known as a Thyrector, which is a trademark of General Electric Company. The Thyrector has the characteristic of serving as a high resistance until a given value of voltage is applied thereacross. When such given value of voltage is applied across the diode 89 the resistance thereof in a forward direction instantaneously decreases to a value which is comparatively small.

The base 84 of the transistor 85 is connected to a breaker point switch 90 through a resistor 91. The breaker point switch 90 may be the conventional breaker point switch or other suitable switch mechanism. A new type of such a switch is discussed below.

When the breaker point switch 90 is closed, the resistance of the transistor 85 is shorted out and sufficient voltage is applied across the diode 89 to cause the resistance thereof to decrease so that sufficient current flows through the gate 88 of the controlled rectifier 82 to place the controlled rectifier 82 in a conductive state. The transistor 85 also assumes a conductive state. Therefore, current flows through the primary winding 76 of the ignition coil 77, through the controlled rectifier 82, through the transistor 85, and to the negative side of the battery 75 through ground.

When the breaker point switch 90 is opened, the transistor 85 immediately assumes a nonconductive state and there is a sudden substantial decrease in the flow of current through the controlled rectifier 82. There is sudden collapse of substantially all of the magnetic field of the core of the ignition coil 77. It has been found that within a few microseconds after such opening of the breaker point switch 90, a reverse voltage occurs across the controlled rectifier 82 which instantaneously causes the controlled rectifier 82 to be nonconductive. Thus, the circuit between the primary winding 76 and the transistor 85 is opened.

The sudden collapse of the magnetic field in the ignition coil 77 and the opening of the circuit through the controlled rectifier 82 creates a high voltage across the primary winding 76, which induces a high voltage across the secondary winding 79 of the ignition coil 77, causing a spark across the spark gap means 81.

An oscillatory current exists between the primary winding 76 and the capacitor 92 for a short period after the controlled rectifier 82 becomes nonconductive.

Due to the fact that the controlled rectifier 82 becomes nonconductive almost immediately after the breaker point switch opens, the transistor 85 is protected against the high voltage which occurs in the primary winding 76 as the magnetic field collapses and during the voltage oscillations which follow.

The value of the capacitor 92 has an effect upon the time required for sufficient reverse voltage to be created across the controlled rectifier 82 to cause nonconduction thereof. The value of the capacitor 92 is selected so that the controlled rectifier 82 is free to become nonconductive after the breaker point switch opens. In this manner, the peak of the voltage becomes much greater than would otherwise occur. Furthermore, of course, the transistor 85 is well protected from such voltages.

As stated above, the diode 89 is preferably of the type which has a high resistance until a given voltage is applied thereacross. This characteristic of the diode 89 makes it ideal as means to prevent "firing" of the controlled rectifier 82 until the breaker point switch 90 is closed. After such closing of the breaker point switch 90 occurs, the voltage across the diode 89 becomes such that there is more than sufficient flow of current therethrough and through the gate 88 of the controlled rectifier 82 to produce a state of conductivity in the controlled rectifier 82. Thus, even when ambient temperature conditions change greatly, the controlled rectifier 82 is readily and consistently made conductive at the desired instant.

FIGURE 6

Figure 6:
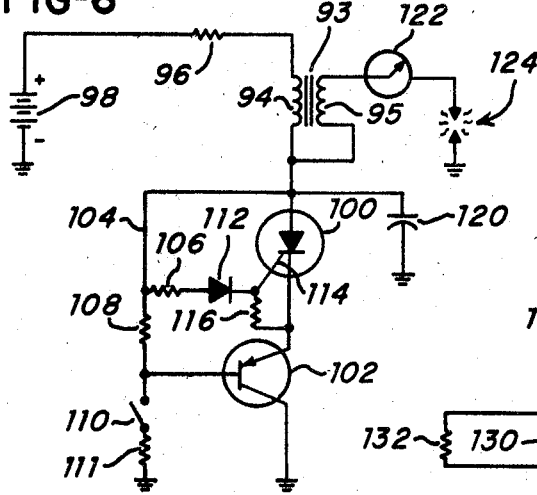

The apparatus of this invention as shown in FIGURE 6 includes an ignition coil or transformer 93 having a primary winding 94 and a secondary winding 95. A ballast resistor 96 connects a battery 98 to the primary winding 94. One side of the battery 98 is shown as being grounded. A semiconductor device 100 of the controlled rectifier type, discussed above, is in series with the primary winding 94.

Connected in series with the controlled rectifier 100 is another semiconductor device in the form of a transistor 102, herein shown as being of a P-N-P type of transistor. A conductor 104 is connected to the juncture between the silicon controlled rectifier 100 and the primary winding 94 and is also connected to a resistor 106 and to a resistor 108. The resistor 108 is in series with a breaker point switch 110 which is connected to ground through a resistor 111. The breaker point switch 110 opens and closes in timed operation with the engine and may be of a conventional type or may be of a type discussed below.

The resistor 106 has in series therewith a diode 112 which connects to a gate or control element 114 of the controlled rectifier 100. A resistor 116 joins the diode 112 to the transistor 102. The primary winding 94 and the secondary winding 95 have a common junction which is shown as being connected to ground through a capacitor 120. The secondary winding 95 has in series therewith any suitable distributor mechanism 122, and spark gap means 124 of a combustion chamber of the engine is in series with the distributor mechanism 122.

The breaker point switch 110 provides means for coupling the base of the transistor 102 to ground. Normally the breaker point switch 110 is open. Thus, the base of the transistor 102 is biased so that there is no appreciable conduction therethrough. When the breaker point switch 110 closes, the base and collector of the transistor 102 have such relative potentials that the transistor 102 is placed in a conductive state. This conduction causes flow of sufficient current through the gate 114 of the controlled rectifier 114 to cause conduction thereof. Thus, there is flow of current through the controlled rectifier 114 and through the primary winding 94 of the ignition coil 93. Current also flows through the transistor 102 to ground.

When the breaker point switch 110 is opened, the transistor 102 immediately assumes a nonconducting state. The current through the primary winding 94 immediately greatly decreases in value. The magnetic field of the core of the ignition coil 93 begins to collapse. As stated above, within a few microseconds after the breaker point switch 110 opens a reverse voltage occurs across the controlled rectifier 100 and the controlled rectifier 100 instantaneously becomes nonconductive. As the magnetic field of the core of the ignition coil 93 continues to collapse, the transistor 102 is protected from the high surge of voltage which occurs in the primary winding 94 and which induces a high voltage in the secondary winding 95, causing a spark across the spark gap means 124.

As discussed above, after the initial voltage surge in the primary winding 94 occurs, there are current and voltage oscillations in the primary winding 94 and in the capacitor 120 which rapidly diminish before the breaker point switch 110 again closes.

FIGURE 7

Figure 7:
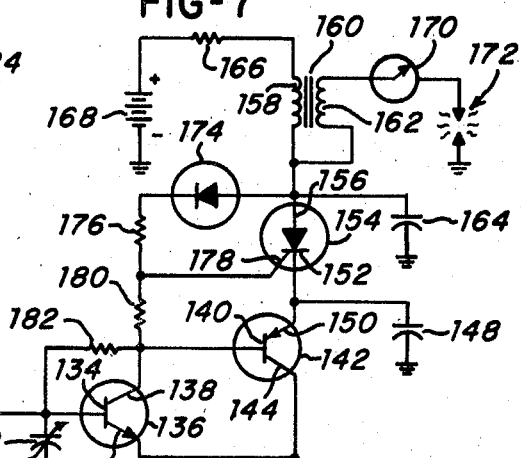

FIGURE 7 shows an ignition control circuit of this invention in which a rotary capacitor 130, similar to the rotary capacitor 33, discussed above, is used. The rotary capacitor 130 is shown as having a resistor 132 connected thereacross. The rotary capacitor 130 is connected to a base 134 of a transistor 135, herein shown as being of the N-P-N type. The transistor 136 has a collector 138 which is connected to a base 140 of a transistor 142, shown as being of the P-N-P type. The transistor 142 has a collector 144 connected to an emitter 146 of the transistor 136, both of which are connected to ground.

A capacitor 148 joins an emitter 150 of the transistor 142 to ground.

The emitter 150 of the transistor 142 is connected to a cathode 152 of a controlled rectifier 154. The controlled rectifier 154 has an anode 156 connected to a primary winding 158 of an ignition coil 160. The ignition coil 160 has a secondary winding 162. A common lead of the primary winding 158 and of the secondary winding 162 is joined to a capacitor 164 which is also connected to ground.

The primary winding 158 is connected through a resistor 166 to a battery 168. The secondary winding 162 is connected through any suitable distributor mechanism 170 to spark plug or spark gap means 172 of a combustion chamber.

A diode 174 connects through a series resistor 176 to a gate 178 of the controlled rectifier 154. The diode 174 may be of the Thyrector type described above or may be of any other suitable type having the nonlinear characteristics of a high resistance until a given voltage is applied thereacross and a comparatively low resistance with a given voltage thereacross.

A resistor 180 joins the resistor 176 to the collector 138 of the transistor 136 and to the base 140 of the transistor 142. A resistor 182 joins the resistor 180 to the rotary capacitor 130.

The rotary capacitor 130 is used to control conduction of the transistor 136, which in turn, controls conduction of the transistor 142. The rotary capacitor 130 is connected to the engine for operation therewith for proper timing of the ignition in each combustion chamber. The rotary capacitor 130 provides means for coupling the base 134 of the transistor 136 to ground. Rotation of the rotary capacitor 130 results in changes from maximum to minimum capacitance of the rotary capacitor 130.

When there is maximum capacitance of the capacitor 130, the bias on the base 134 of the transistor 136 is changed and there is flow of current through the transistors 136 and 142 and through the controlled rectifier 154 and through the primary winding 158. When the rotary capacitor 130 is rotated to a position of minimum capacitance the transistors 136 and 142 assume conditions of nonconductance.

When such a nonconductance condition of the transistor 142 occurs, collapse of the magnetic field in the core of the ignition coil 158 occurs. As stated above, within a few microseconds following the time that the transistor 142 assumes a nonconductive condition, a reverse voltage across the controlled rectifier 154 occurs which causes the controlled rectifier 154 to be nonconductive. Thus, as discussed above, the transistor 142 is protected from the high voltage surge which occurs in the primary winding 158 and which causes high operating voltage in the secondary winding 162. The transistor 142 is also protected from the voltage oscillations which occur in the capacitor 164 and in the primary winding 158 after a spark is created across the spark gap means 172.

The capacitor 148 aids in applying desired bias voltage to the transistor 142.

FIGURE 8

Figure 8:
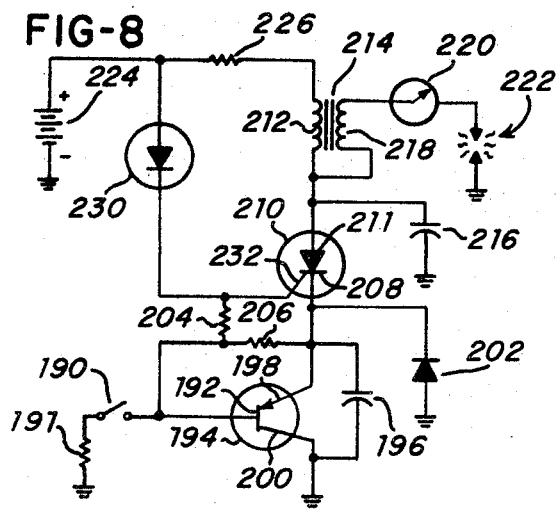

The apparatus of this invention as disclosed in FIGURE 8 comprises a breaker point switch 190 which is connected to ground through a resistor 191 and which is also joined to a base 192 of a transistor 194. A capacitor 196 is shown as being connected from an emitter 198 of the transistor 194 to a collector 200 thereof. The collector 200 is also joined to ground. A diode 202 is shown as being connected in parallel with the capacitor 196. The capacitor 196 and the diode 202 provide better bias voltage conditions to the emitter 198 of the transistor 194. The capacitor 196 and the diode 202 also provide means by which energy may flow to the controlled rectifier for providing a reverse voltage thereto. With the use of certain types or sizes of transistors, the capacitor 196 and/or the diode 202 may not be necessary in the circuit.

Resistors 204 and 206 are joined in series and connected from the emitter 198 of the transistor 194 to a gate 232 of a controlled rectifier 210. A cathode 208 of the controlled rectifier 210 is connected to the emitter 198 of the transistor 194. An anode 211 of the controlled rectifier 210 is joined to a primary winding 212 of an ignition coil 214. The anode 211 of the controlled rectifier 210 is also connected to a capacitor 216 which is grounded. With the use of certain types of transistors and/or controlled rectifiers the capacitors 216 may not be necessary in the circuit. If both the capacitor 216 and the capacitor 196 are used, it is preferable that the capacitance of the capacitor 196 be smaller than the capacitance of the capacitor 216.

The ignition coil 214 has a secondary winding 218 which has one end thereof connected to the primary winding 212. The secondary winding 218 is connected by any suitable distributor means 220 to spark gap means or spark plug means 222 which is, in turn, grounded.

The primary winding 212 of the ignition coil 214 also is connected to a battery 224 through a resistor 226. The opposite side of the battery 224 is grounded. The resistor 226 has joined thereto a diode 230 which may be of the Thyrector type or of any type having the characteristic of a high resistance until a given value of voltage is applied thereacross and a comparatively low forward resistance while a given value of voltage is applied thereacross. The diode 230 is connected to the gate 232 of the controlled rectifier 210. The breaker point switch 190 serves as means to couple the base of the transistor 190 to ground and to provide proper voltage to the base 192 to cause conduction of the transistor 194. When the breaker point switch 190 is closed, the controlled rectifier 210 and the transistor 194 are caused to become conductive. Therefore, a direct current flows through the primary winding 212 of the ignition coil 214.

When the breaker point switch 190 is opened the transistor 194 assumes its nonconductive state and within a few microseconds the controlled rectifier 194 assumes a nonconductive state. Thus, as described above with respect to FIGURES 5, 6, and 7, there is a voltage surge in the primary winding 158 of the ignition coil 160. Because the controlled rectifier 210 is nonconductive, the transistor 194 is protected from the high voltage which occurs in the primary winding 212 and which causes high operational voltage in the secondary winding 218.

After the breaker point switch 190 opens and the transistor 194 becomes nonconductive, the capacitor 196, when used in certain sizes with certain types of transistors 194, forms a parallel load circuit with the transistor 194, the parallel circuit being in series with the primary winding 212, through the controlled rectifier 210, and an oscillatory circuit is produced. Thus, after the breaker point switch 190 opens and the transistor 194 assumes a nonconductive resistance condition, an oscillatory voltage is created which quickly produces a reverse voltage across the controlled rectifier 210 and in this manner causes the controlled rectifier 210 to become nonconductive.

FIGURE 9

Figure 9:
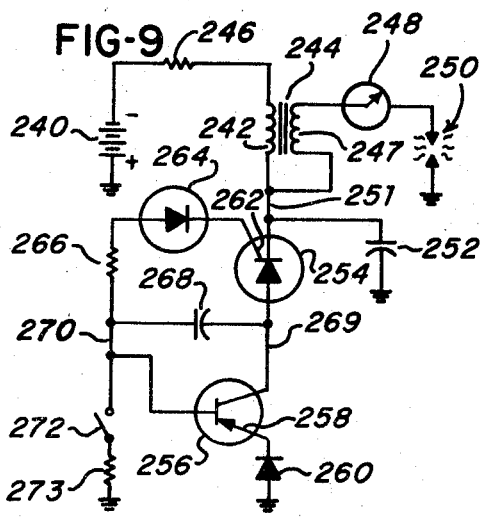

The apparatus of this invention as shown in FIGURE 9 is particularly adapted for use in an ignition system in which the positive side of the system is grounded. A battery 240 is shown which has the positive side thereof grounded. The negative side of the battery 240 is connected to a primary winding 242 of an ignition coil or transformer 244 through a ballast resistor 246. The ignition coil or transformer 244 has a secondary winding 247 which is connected through any suitable distributor means 248 to spark gap means 250 which has one side thereof grounded.

The primary winding 242 and the secondary winding 247 have a common lead 251 which is grounded through a capacitor 252.

In series with the primary winding 242 of the ignition coil 244 is a controlled rectifier 254 which is, in turn, connected to a transistor 256. The transistor 256 has an emitter 258 which is connected to a diode 260 which has one side thereof grounded. The controlled rectifier 254 has a gate 262 connected to a diode 264 which is connected in series with a resistor 266. The diode 264 is preferably of the type described above and referred to by the trademark, Thyrector. A resistor 266 is connected to a capacitor 268 which is also connected to a conductor 269 which joins the controlled rectifier 254 and the transistor 256. A conductor 270 is connected to the capacitor 268 and to the base of the transistor 256 and to a breaker point switch 272. A resistor 273 joins the breaker point switch 272 to ground.

When the breaker point switch 272 is closed the transistor 256 becomes conductive so that current flows through the transistor 256 and through the controlled rectified 254 and through the primary winding 242 of the ignition coil 244. When the breaker point switch 272 is opened the transistor 256 suddenly assumes a nonconductive state. As discussed above, this sudden reduction in current flow through the primary winding 242 causes a voltage surge. Within a few microseconds a reverse voltage occurs across the controlled rectifier 254 causing the controlled rectifier 254 to assume a nonconductive condition. The transistor 256 is thus protected against the high voltages created in the primary winding 242 and which result in induced high voltages in the secondary winding 247. Thus, the high voltage induced in the secondary winding 247 of the ignition coil 244 causes a spark across the spark gap means 250.

It is to be noted that the switching mechanism which comprises the transistor 256 and the controlled rectifier 254, is located between the positive side of the battery 240 and the coil 242, rather than between the negative side of the battery 240 and the winding 242, as in FIGURES 1, 5, 6, 7, and 8. This illustrates that apparatus of this invention is operative whether the switching mechanism, comprising a controlled rectifier and a transistor, is between the negative side of a source of electrical energy and an ignition coil or between the positive side of the source of electrical energy and an ignition coil. The important consideration is that the controlled rectifier is connected between the ignition coil and the transistor so that the controlled rectifier serves as a shield and protects the transistor from high voltages occurring in the ignition coil.

FIGURE 10

Figure 10:
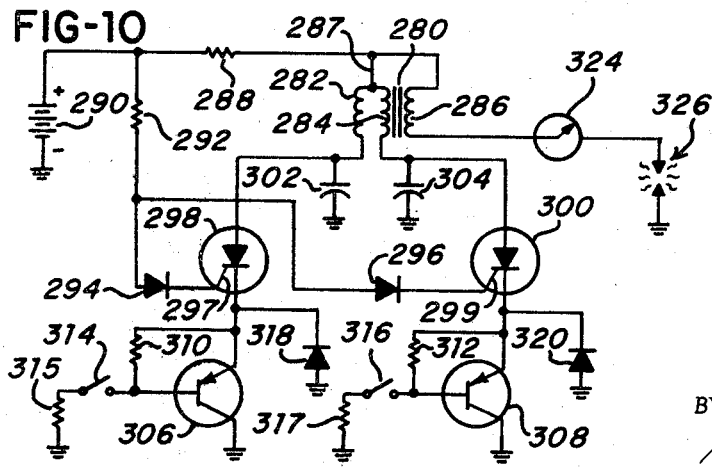

The apparatus of this invention as shown in FIGURE 10 comprises circuitry in which an ignition coil or transformer 280 is provided with two primary windings, there being a primary winding 282 and a primary winding 284. The ignition coil 280 also has a secondary winding 286. The windings 282, 284, and 286 are wound on a common core and have a common juncture 287 connected to a ballast resistor 288. The ballast resistor 288 is connected to a battery 290. A resistor 292 is also connected to the battery 290. A diode 294 is connected to the resistor 292 and a diode 296 is connected thereto. The diode 294 is joined to a gate 297 of a controlled rectifier 298 and the diode 296 is connected to a gate 299 of a controlled rectifier 300.

The controlled rectifier 298 is joined to the primary winding 282, and the controlled rectifier 300 is joined to the primary winding 284. The primary winding 282 has a capacitor 302 connected thereto. The primary winding 284 has a capacitor 304 connected thereto. In series with the controlled rectifier 298 is a transistor 306. Connected in series with the controlled rectifier 300 is a transistor 308. The collector of each of the transistors 306 and 308 is connected to ground.

The transistor 306 has a resistor 310 connected from the emitter thereof to the base thereof. The transistor 308 has a resistor 312 connected from the emitter thereof to the base thereof. In series with the resistor 310 is a breaker point switch 314. In series with the resistor 312 is a breaker point switch 316. A resistor 315 is in series with the breaker point switch 314 and a resistor 317 is in series with the breaker point switch 316.

Connected from ground to the emitter of the transistor 306 is a diode 318. Connected from ground to the emitter of the transistor 308 is a diode 320.

In series with the secondary winding 286 is any suitable distributor mechanism 324 which is joined to a spark plug or spark gap means 326 which is also joined to ground.

The primary winding 282 and the primary winding 284 are wound upon the ignition coil or transformer 280 so that when current is flowing from the battery 290 through the primary winding 282, a magnetic field is created in the core of the ignition coil 280 in the opposite direction from the magnetic field created in the core of the ignition coil 280 when the current is flowing from the battery 290 through the primary winding 284.

During operation the breaker point switches 314 and 316 alternately open and close for initiating conductance and nonconductance of the transistors 306 and 308 and of the controlled rectifiers 298 and 300. The controlled rectifiers 298 and 300 operate in the same manner as discussed above. Therefore, there is a complete collapse of the magnetic field in the core of the ignition coil 280 during each cycle of operation of each of the primary windings 282 and 284 and no residual magnetism remains at the instant one of the coils is energized. Thus, a higher voltage in the primary windings 282 and 284 is obtained and a higher voltage in the secondary winding 286 results.

FIGURE 11

FIGURE 11 shows switch mechanism in which a rotary shaft 330 has a collar 332 provided with a plurality of conductor portions 334. The conductor portions are separated by nonconductive portions or insulator portions 335.

A contact finger 336 is pivotally attached to support structure 337 and has a contact tip 338 in engagement with the collar 332. The support structure 337 is carried by a plate 339. A spring member 340 urges movement of the finger 336 toward the collar 332.

The mechanism of FIGURE 11 is adapted to replace or to be substituted for conventional breaker point switch mechanism. The shaft 330 is adapted to be electrically grounded for a part of an electrical circuit and operable by suitable mechanism of the engine. Preferably, the mechanism of FIGURE 11 is provided with mechanical advance means (not shown) and with vacuum advance means (not shown) in a manner in which conventional breaker point switch mechanisms are so provided.

The contact finger 336 has an electrical connection lead 346 extending therefrom for connection to any element as desired.

Rotation of the collar 332 by means of the shaft 330 causes movement of the contact portions 334 and the insulated portions 335 so that at any given time either a portion 334 or a portion 335 is in engagement with the tip 338 of the finger 336. Thus, with rotation of the shaft 330 there is opening and closing of the circuit between the shaft 330 and the lead 346. Thus, when the mechanism of FIGURE 11 replaces a conventional breaker point switch, the circuit which controls spark ignition has no moving contacts which bounce upon impact and which frequently touch and carry current in only small portions thereof as occurs with a conventional breaker point switch. The switch of this invention shown in FIGURE 11 operates smoothly as the tip 338 remains in engagement with the collar 332.

FIGURES 12 and 13

FIGURES 12 and 13 show support and housing structure for any of the circuits shown in the diagrammatic figures discussed above. The support and housing structure also serves as a radiator means for a transistor and for other devices attached thereto. A housing 350 has a cavity 351 therewithin and is provided with a plurality of radiator fins 352, of various lengths, extending in substantially parallel relation. The housing 350 is adapted to support a transistor 354 intermediate two transversely extending fins 356. The transistor 354 is attached to a wall 357 of the housing 350. The transistor 354 is shown as being in engagement with a small sheet of heat conductive material 359.

A plurality of terminals 361 extend into the cavity 351 for use as connection members. Each of the fins 356 is joined to a pair of short fins 358 which are parallel to the fins 352.

A stud 360 extends from the cavity 351 through the wall 357 of the housing 350 and into the area formed by each fin 356 and its adjoining fins 358. Each stud 360 is shown as having a nut 362. The stud 360 is adapted to support any of the elements such as a controlled rectifier 363 within the cavity 351 of the housing 350.

A controlled rectifier, such as 363 and the other devices discussed above, produces high frequency voltages which cause radio frequency interference. However, in the structure of this invention the transverse fins 356 protect the transistor 354 from any high frequency voltages of the controlled rectifier 363. The fins 352, 356, and 358 also, of course, provide excellent heat transfer from the transistor 354.

FIGURES 14a, 14b, and 14c

FIGURE 14c illustrates the use of a new semiconductor device 400 which has a plurality of P and N zones and which has a plurality of intermediate junctions. Thus, the semiconductor device can be adapted to a circuit such as shown in FIGURES 6 and 8 and as discussed above. The semiconductor device 400 serves both as a controlled rectifier and as a transistor.

A diode 402 and an adjustable resistor 404 in series therewith are connected in series with a gate 406. A breaker point switch 408 serves to open and to close a circuit from ground to junctions 410 and 412 of the semiconductor device 400.

FIGURE 14b illustrates the construction of the semiconductor device 400. FIGURE 14a illustrates the analogy between the semiconductor device 404 and a plurality of transistors. FIGURE 14a also shows the analogy between a diode of the Thyrector type having the characteristics discussed above and a series combination of the adjustable resistor 404 and a conventional diode 402.

FIGURES 15a, 15b, and 15c

FIGURE 15c shows the use of a new semiconductor device 420 which has a plurality of P and N zones and which may be used in a circuit such as shown in FIGURE 5 and which serves as both a controlled rectifier and as a transistor. The semiconductor device 420 has a gate junction 422 and base junctions 424 and 426.

FIGURE 15b illustrates the construction of the semiconductor device 420 and FIGURE 15a illustrates the analogy between the semiconductor device 420 and a plurality of transistors.

FIGURE 16

FIGURE 16 shows another modification in the ignition control apparatus of this invention. A battery 450 is shown as having the positive side thereof connected to a conventional ignition switch 451. The ignition switch 451 is connected to a choke 452 which has a diode 454 in series therewith. The opposite side of the battery 450 is grounded. A breaker point switch 456 joins the diode 454 to ground.

Also connected to the positive side of the battery 450 is a primary winding 460 of an ignition coil 462. The ignition coil 462 has a secondary winding 363 which is connected through suitable distributor means 466 to spark gap means 468, which is joined to ground. A capacitor 469 connects the windings 460 and 464 to ground.

The primary winding 460 is connected to an anode 470 of a controlled rectifier 472. A cathode 474 of the controlled rectifier 472 is connected to ground. The controlled rectifier 472 has a gate or control element 476 which is connected to ground through a resistor 478. A diode 480 is also connected to the gate 476. The diode 480 is preferably of the type, discussed above, which has the characteristic of being a high value resistor until a given voltage is applied thereacross and a relatively low value resistor when a given value of voltage is applied thereacross.

A conductor 482 connects the diode 480 to the anode 470 of the controlled rectifier 472. A capacitor 484 joins the diode 480 to the diode 454.

When the ignition switch 451 is closed, a circuit is established through the primary winding 460, through the conductor 482, through the diode 480, and through the gate 476. Because the voltage applied across the diode 480 is sufficiently high, the resistance thereof is relatively low. Therefore, sufficient current flows through the gate 476 that the controlled rectifier 472 becomes conductive. Thus, there is an increasing flow of current through the primary winding 460 until the core of the ignition coil 462 becomes saturated.

The flow of current through the primary winding 460 results in such a voltage drop across the primary winding 460 that the voltage across the diode 480 decreases to such an extent that the diode 480 becomes a high value resistor. Thus, the current therethrough decreases to such an extent that the current through the gate 476 is insufficient to cause the controlled rectifier 472 to be in its conductive state. However, the flow of current through the controlled rectifier 472 is sufficient to maintain the controlled rectifier 472 in its conductive state.

Such action in the controlled rectifier 472 occurs whether the breaker point switch 456 is open or closed. However, when the breaker point switch 456 is open while current is so flowing through the controlled rectifier 472, the capacitor 484 becomes charged to approximately twice the voltage of the battery 450, because of the choke 452 and the diode 454 which are also in the circuit. Therefore, when the breaker point switch 456 again closes, there is a discharge of the capacitor 484. This discharge of the capacitor 484 momentarily causes the cathode 474 of the controlled rectifier 472 to be more positive by several volts than the anode 470. Therefore, the controlled rectifier 472 instantaneously becomes nonconductive and the flow of current through the primary winding 460 suddenly stops. Thus, a voltage is created across the primary winding 460 which induces a high voltage across the secondary winding 464 so that a spark occurs across the spark gap means 468.

It is to be understood that the apparatus of this invention comprises means by which a transistor which is capable of withstanding comparatively low voltages can be used to control a load in a high voltage circuit. Semiconductor controlled rectifier means in series with a transistor, as shown in several of the figures of the drawings, serves as voltage divider means. Thus, a transistor in series with the semiconductor controlled rectifier means makes possible control of high voltage energy. For example, as illustrated in the several figures of the drawings, a transistor is connected in series with a controlled rectifier which is connected to a load in which high voltage energy occurs. However, due to the fact that a semiconductor controlled rectifier is in series with the transistor, the transistor which has comparatively low voltage ratings is capable of controlling flow of electrical energy in the load. Thus, the apparatus of this invention is capable of high voltage energy control in circuits other than automotive ignition circuits.

Also, the apparatus of this invention in which a semiconductor rectifier is used in combination with a transistor provides means by which the combination serves as a thyratron type of device. The gate or control element of the semiconductor rectifier does not have control over the values of current flow through the device. The gate merely serves a means to initiate current flow through the semiconductor device.

However, a transistor in series with the semiconductor device provides means by which the value of current flow through the semiconductor device is controlled.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Ignition control apparatus for an internal combustion engine provided with a source of direct current energy, an ignition coil including a primary winding and a mutually coupled secondary winding, capacitance means connected to the primary winding and to the secondary winding and to the source of direct current energy, means connecting the primary winding to the source of direct current energy, spark gap means connected to the secondary winding, the improvement comprising:
    a controlled rectifier having an anode and a cathode and a gate junction,
    means connecting the anode of the controlled rectifier to the primary winding of the ignition coil,
    means connecting the gate junction to the source of direct current energy, said means triggering said controlled rectifier to a conductive state,
    inductance means connected in series with the cathode of the controlled rectifier and joined to the source of direct current energy,
    rotary capacitor means mechanically operable by the engine and electrically connected across the series combination of the controlled rectifier and the inductance means,
    the rotary capacitor means having a capacitance which alternately changes from a maximum capacitance to a minimum capacitance with rotation thereof, the capacitor means having a substantially maximum capacitive impedance which is substantially equal to the inductive impedance of the inductance means, said rotary capacitor means biasing said controlled rectifier to non-conduction by applying a determined value of reverse voltage across said controlled rectifier when the capacitance value of said rotary capacitor means is maximum.

2. Ignition control apparatus for an internal combustion engine of the type having an ignition coil provided with a primary winding and a mutually coupled secondary winding, a source of electrical energy, a capacitor connected to the primary winding and to the secondary winding and to the source of electrical energy, means connecting the primary winding of the ignition coil to the source of electrical energy, spark gap means, means connecting the spark gap means to the secondary winding of the ignition coil and to the source of electrical energy, the improvement comprising:
    a semiconductor device having a plurality of successive zones of semiconducting material of P and N types forming a plurality of P-N junctions, there being a pair of end zones and a plurality of intermediate zones,
    means connecting an end zone of the semiconductor device to the primary winding of the ignition coil,
    inductance means connecting an opposite end zone of the semiconductor device to the source of electrical energy,
    a rotary capacitor member connecting the first said end zone of the semiconductor device to the source of electrical energy, the rotary capacitor member having a plurality of stationary plates and a plurality of rotatable plates so that the rotary capacitor member has a capacitance which alternately changes from a maximum value to a minimum value during rotation thereof, said rotary capacitor member biasing said semiconductor device to non-conduction by applying a determined value of reverse voltage to said semiconductor device when the capacitance value of said rotary capacitor means is a maximum,
    a timer combination of capacitor means and resistance means connected in series across the source of electrical energy,
    means connecting a juncture intermediate the capacitor means and said resistance means to an intermediate zone of the semiconductor device, said means triggering said semiconductor device to a conductive state.

3. Ignition control apparatus for an internal combustion engine of the type provided with an ignition coil having a primary winding and a secondary winding, spark gap means, a source of electrical energy, means connecting the spark gap means to the source of electrical energy and to the secondary winding of the ignition coil, capacitor means connected to the primary winding of the ignition coil, means connecting the primary winding to the source of electrical energy, means connecting the capacitor means to the source of electrical energy, the improvement comprising:
    a four-zone semiconductor device having a pair of end zones and two intermediate zones,
    means connecting an end zone of the semiconductor device to the capacitor means and to the primary winding of the ignition coil,
    inductance means connecting an opposite end zone of the semiconductor device to the source of electrical energy,
    timed current discharge means connected across the source of electrical energy,
    means connecting the timed current discharge means to an intermediate zone of the semiconductor device, said discharge means triggering said semiconductor device into a conductive state,
    and variable capacitor means connecting the first said end zone of the semiconductor device to the source of electrical energy, said variable capacitor means biasing said semiconductor device to non-conduction by applying a determined value of reverse voltage across said semiconductor device when said variable capacitor means has a maximum capacitance value.

4. For an internal combustion engine provided with a source of electrical energy, an ignition coil having a primary winding and a secondary winding, spark gap means, means connecting the spark gap means to the secondary winding of the ignition coil, capacitor means connected to the primary winding of the ignition coil and to the source of electrical energy, the improvement including ignition control apparatus comprising:
    a four-zone semiconductor device provided with a pair of end zones and a pair of intermediate zones, the semiconductor device having a stable high-impedance state and a quasi-stable high conductance state, the semiconductor device changing from its stable state to its quasi-stable state when current above a given value is passed through one of its intermediate zones and flows through at least one of said end zones, one of the end zones of the semiconductor device thus being normally positive and the other end zone thus being normally negative, the semiconductor device changing from its quasi-stable state to its stable state when a voltage is applied to the end zones thereof which is opposite the normal voltage applied thereto, circuit means connecting the primary winding to an end zone of the semiconductor device, circuit means connecting one of the intermediate zones of the semiconductor device to the source of electrical energy, oscillator means including rotary capacitor means connected to the semiconductor device and to the source of electrical energy for causing a voltage across the semiconductor device in a direction opposite to said normal voltage, and means mechanically connectable to said rotary capacitor means of said oscillator means and to said engine for initiation of said oscillator means by control of said portion thereof when said capacitance value of said rotary capacitor means is a maximum.

5. In ignition apparatus:

an ignition coil provided with a primary winding and a secondary winding, spark gap means connected to the secondary winding of the ignition coil, a semiconductor controlled rectifier connected in series with the primary winding of the ignition coil, a transistor connected in series with the controlled rectifier, a source of electrical energy connected to the combination of said ignition coil, said semiconductor controlled rectifier, and said transistor, circuit closing means connected from the source of electrical energy to the transistor, closing of said circuit closing means biasing said transistor to conduction, said conducting transistor causing said semiconductor controlled rectifier to be biased to conduction, opening of said circuit closing means biasing said transistor and said semiconductor controlled rectifier to nonconduction.

6. Ignition control apparatus for internal combustion engine mechanism provided with a source of electrical energy comprising:

semiconductor means provided with a plurality of P-N junctions separating a plurality of semiconductor zones, the semiconductor means having a stable high impedance state and a quasi-stable high conductance state, the semiconductor device changing from its stable state to its quasi-stable state when current above a given value is passed through one of its P-N junctions and flows through at least one of said zones so that current flows through the semiconductor means in a given direction, the semiconductor means changing from its quasi-stable state to its stable state when current is forced through the semiconductor means in a direction opposite said given direction, and control means including a rotary capacitor means mechanically connected to said engine mechanism electrically connected to the semiconductor means and to the source of electrical energy for causing the semiconductor device to assume its quasi-stable state and for causing the semiconductor device to assume its stable state when the capacitance value of said rotary capacitor means is a maximum.

7. Ignition control apparatus for an internal combustion engine mechanism provided with a source of electrical energy, an ignition coil having a primary winding and a secondary winding, electrical switch mechanism operable by operation of the engine comprising:

a first semiconductor device, the first semiconductor device having a plurality of zones of P and N type semiconductor material forming an odd number of P-N junctions, the first semiconductor device having an end zone connected to the primary winding of the ignition coil, the first semiconductor device having an intermediate zone, a second semiconductor device, the second semiconductor device having a plurality of zones of P and N type semiconductor material forming an even number of P-N junctions, the second semiconductor having an intermediate zone, diode means connecting an intermediate zone of the first semiconductor device to the source of electrical energy, resistor means connecting said intermediate zone of the first semiconductor device to the intermediate zone of the second semiconductor device, means connecting the electrical switch mechanism to the intermediate zone of the second semiconductor device, closing of said switch mechanism biasing said second semiconductor device to conduction causing said first semiconductor device to be biased to conduction, means connecting the other end zone of the first semiconductor device to an end zone of the second semiconductor device, means connecting the other end zone of the second semiconductor device to the source of electrical energy, bias means connected between the source of electrical energy and said other end zones of said semiconductor devices, said bias means providing reverse voltage to said first semiconductor device biasing said first semiconductor device to non-conduction when said switch mechanism is open.

8. Ignition control apparatus for internal combustion engine mechanism of the type provided with a source of electrical energy, an ignition transformer having a winding which has a portion thereof connected to the source of electrical energy, and electrical coupler means operable with operation of the engine and having a portion connected to the source of electrical energy, the improvement comprising:

a controlled rectifier of the type having a plurality of P-N zones forming an anode and a cathode and a gate, a transistor provided with a collector and a base and emitter, means connecting the anode of the controlled rectifier to another portion of the winding of the ignition coil, diode means connected from the source of electrical energy to the gate of the controlled rectifier, the diode means being of the type having a high value of resistance when a voltage below a given value is applied thereacross and having a relatively low resistance when a voltage above a given value is applied thereacross, resistive means connecting the gate of the controlled rectifier to the base of the transistor, means connecting the base of the transistor to the electrical coupler means, said coupler means for applying biasing signals to said base of said transistor thereby biasing said transistor, said biased transistor causing said controlled rectifier to be biased, means connecting the collector of the transistor to the source of electrical energy, means connecting the anode of the controlled rectifier to the emitter of the transistor.

9. In ignition apparatus for internal combustion engine mechanism provided with a source of electrical energy, ignition coil means, semiconductor means, means connecting the semiconductor means to the ignition coil means, the semiconductor means having a first end zone, means connecting the first end zone of the semiconductor means to the ignition coil means, the semiconductor means having a second end zone, inductance means connecting the second end zone of the semiconductor means to the source of electrical energy, the semiconductor means being provided with an intermediate junction, means connecting the intermediate junction to the source of electrical energy for causing the semiconductor means to assume a conductive condition, rotary capacitor means mechanically operable by said internal combustion mechanism, means electrically connecting the rotary capacitor means to the source of electrical energy and to the said first end zone of semiconductor means, the rotary capacitor having an adjustable electrical capacitance value at which an oscillatory current action is produced with said inductance means which is connected to said second end zone of the semiconductor means, thus causing the semiconductor means to assume a nonconductive condition when the electrical capacitance value of the rotary capacitor is a maximum.

10. Ignition control apparatus for internal combustion engine mechanism of the type having a source of electrical energy, an ignition coil connected to the source of electrical energy, spark gap means, and breaker point switch mechanism, the improvement comprising:

inductor means, means connecting the inductor means to the source of electrical energy, rectifier means connected in series with the inductor means, the rectifier means also being connected to the source of electrical energy, a P-N-P-N semiconductor device having a pair of end zones and a pair of intermediate zones, means connecting an end zone of the semiconductor device to the ignition coil, means connecting an opposite end zone of the semiconductor device to the source of electrical energy, a capacitor means, means connecting the capacitor means to said rectifier means, a diode of the type having a high value of forward resistance until a given voltage is applied thereacross, the diode having a relatively low forward resistance when a given value of voltage is applied thereacross, said diode biasing said semiconductor device to conduction when said given voltage is applied thereacross, means connecting the diode to the capacitor means, means connecting the diode to an intermediate zone of the semiconductor device, means connecting the capacitor and the diode to the first said end zone of the semiconductor device, discharge of said capacitor means biasing said semiconductor device to nonconduction.

11. In ignition control apparatus, a source of electrical energy, an ignition coil connected to the source of electrical energy, a P-N-P-N-P-N-P semiconductor device having a pair of end zones and five intermediate zones, means connecting an end zone of the semiconductor device to the ignition coil, means connecting the opposite end zone of the semiconductor device to the source of electrical energy, diode means, means connecting the diode means to the source of electrical energy and to at least two of the intermediate zones of the semiconductor device, and switch means connecting an intermediate zone adjacent said opposite end zone and said diode means to said source of electrical energy, closing of said switch means biasing said opposite end zone and said adjacent intermediate zone and the successive intermediate zone to conduction causing said remaining intermediate zones and said remaining end zone to be biased to conduction, opening of said switch means biasing said semiconductor device to nonconduction.

12. In ignition control apparatus for internal combustion engine mechanism provided with a source of electrical energy, impedance means connected to the source of electrical energy, rectifier means connected in series with the impedance means, control means connected in series with the rectifier means and also being connected to the source of electrical energy, ignition coil means connected to the source of electrical energy, controlled rectifier means connected in series with the ignition coil means, means connecting the controlled rectifier means to the source of electrical energy, a series of capacitance means and diode means connected from the rectifier means to the controlled rectifier means, the diode means being of the type which has high resistance values unless a give voltage is applied thereacross and having relatively low resistance values in a forward direction while voltages above a given value are applied thereacross, means connecting the juncture between the diode means and the capacitor means to the controlled rectifier means, opening of said control means causing said capacitance means to become charged to a high value, closing of said control means causing said charge on said capacitance means to bias said controlled rectifier means to non-conduction thereby terminating current flow through said ignition coil.

13. Ignition control apparatus for engine mechanism provided with a source of electrical energy, ignition coil means connected to the source of electrical energy, comprising:

a diode, means connecting the diode in series with the ignition coil means, adjustable capacitor means, means mechanically attaching the adjustable capacitor means to the engine mechanism for operation therewith, means electrically connecting the adjustable capacitor means to the diode and to the source of electrical energy, controlled rectifier means, means connecting the controlled rectifier means to the diode, impedance means, means connecting the impedance means to the controlled rectifier means and to the source of electrical energy, means connecting the controlled rectifier means to the source of electrical energy for initiating the controlled rectifier means into a conductive state, the current flowing through the ignition coil means and through the diode to the adjustable capacitor thus creating a voltage charge upon the adjustable capacitor means which is of such a value that a high value oscillatory voltage is caused between the adjustable capacitor means and the impedance means, through the controlled rectifier means, so that a reverse voltage occurs across the controlled rectifier means and causes the controlled rectifier means to become nonconductive.

14. In an ignition apparatus for an internal combustion engine mechanism having a source of energy, spark gap means, ignition coil means, means connecting said spark gap means to said ignition coil means, semiconductor means, means connecting said semiconductor means to said ignition coil means, inductance means connecting said semiconductor means to said source of energy, means connecting said semiconductor means to said source of energy biasing said semiconductor means to conduction producing a magnetic field in said ignition coil means, rotary capacitor means having plates displaced by said internal combustion mechanism, means electrically connecting said rotary capacitor means to said source of energy and to said semiconductor means, the capacitance of said rotary capacitor means alternately changing from a maximum capacitance value to a minimum capacitance value with rotation of said plates, said capacitance means having a maximum impedance which is substantially equal to the impedance of said inductance means, said rotary capacitor means and said inductance means cooperating to apply a determined value of reverse voltage to said semiconductor means when said capacitance value of said rotary capacitor means is maximum biasing said semiconductor means to non-conduction causing a collapse of said magnetic field producing a high voltage in said ignition coil means causing a spark across said spark gap means.

15. In an ignition apparatus for an internal combustion engine mechanism having a source of energy, spark gap means, ignition coil means, means connecting said spark gap means to said ignition coil means, a three terminal semiconductor means, means connecting a first terminal of said semiconductor means to said ignition coil means, inductance means connecting a second terminal of said semiconductor means to said source of energy, means connecting a third terminal of said semiconductor means to said source of energy biasing said semiconductor means to conduction producing a magnetic field in said ignition coil means, rotary capacitor means having plates displaced by said internal combustion mechanism, means electrically connecting said rotary capacitor means to said source of energy and to said first terminal of said semiconductor means, the capacitance of said rotary capacitor means alternately changing from a maximum capacitance value to a minimum capacitance value with rotation of said plates, said capacitance means having a maximum impedance which is substantially equal to the impedance of said inductance means, said rotary capacitor means and said inductance means cooperating to apply a determined value of reverse voltage to said semiconductor means when said capacitance value of said rotary capacitor means is maximum biasing said semiconductor means to non-conduction causing a collapse of said magnetic field producing a high voltage in said ignition coil means causing a spark across said spark gap means.

16. In an ignition apparatus for an internal combustion engine mechanism having a source of energy, spark gap means, ignition coil means, means connecting said spark gap means to said ignition coil means, controlled rectifier means, means connecting said controlled rectifier means to said ignition coil means, inductance means connecting said controlled rectifier means to said source of energy, means connecting said controlled rectifier means to said source of energy biasing said controlled rectifier means to conduction producing a magnetic field in said ignition coil means, rotary capacitor means having plates displaced by said internal combustion mechanism, means electrically connecting said rotary capacitor means to said source of energy and to said controlled rectifier means, the capacitance of said rotary capacitor means alternately changing from a maximum capacitance value to a minimum capacitance value with rotation of said plates, said capacitance means having a maximum impedance which is substantially equal to the impedance of said inductance means, said rotary capacitor means and said inductance means cooperating to apply a determined value of reverse voltage to said controlled rectifier means when said capacitance value of said rotary capacitor means is maximum biasing said controlled rectifier means to non-conduction causing a collapse of said magnetic field producing a high voltage in said ignition coil means causing a spark across said spark gap means.

17. In an ignition apparatus for an internal combustion engine mechanism having a source of energy, spark gap means, ignition coil means, means connecting said spark gap means to said ignition coil means, controlled rectifier means having an anode and a cathode and a gate junction, means connecting said anode of said controlled rectifier means to said ignition coil means, inductance means connecting said cathode of said controlled rectifier means to said source of energy, means connecting said gate junction of said controlled rectifier means to said source of energy biasing said controlled rectifier means to conduction producing a magnetic field in said ignition coil means, rotary capacitor means having plates displaced by said internal combustion mechanism, means electrically connecting said rotary capacitor means to said source of energy and to said anode of said controlled rectifier means, the capacitance of said rotary capacitor means alternately changing from a maximum capacitance value to a minimum capacitance value with rotation of said plates, said capacitance means having a maximum impedance which is substantially equal to the impedance of said inductance means, said rotary capacitor means and said inductance means cooperating to apply a determined value of reverse voltage to said controlled rectifier means when said capacitance value of said rotary capacitor means is maximum biasing said controlled rectifier means to non-conduction causing a collapse of said magnetic field producing a high voltage in said ignition coil means causing a spark across said spark gap means.

18. In an ignition apparatus for an internal combustion engine mechanism having a source of energy, spark gap means, ignition coil means, means connecting said spark gap means to said ignition coil means, controlled rectifier means having an anode and a cathode and a gate junction, means connecting said anode of said controlled rectifier means to said ignition coil means, inductance means connecting said cathode of said controlled rectifier means to said source of energy, switch means connecting said gate junction of said controlled rectifier means to said source of energy biasing said controlled rectifier means to conduction producing a magnetic field in said ignition coil means, rotary capacitor means having plates displaced by said internal combustion mechanism, means electrically connecting said rotary capacitor means to said source of energy and to said anode of said controlled rectifier means, the capacitance of said rotary capacitor means alternately changing from a maximum capacitance value to a minimum capacitance value with rotation of said plates, said capacitance means having a maximum impedance which is substantially equal to the impedance of said inductance means, said rotary capacitor means and said inductance means cooperating to apply a determined value of reverse voltage to said controlled rectifier means when said capacitance value of said rotary capacitor means is maximum biasing said controlled rectifier means to nonconduction causing a collapse of said magnetic field producing a high voltage in said ignition coil means causing a spark across said spark gap means.

19. In an ignition apparatus for an internal combustion engine mechanism having a source of direct current energy, spark gap means, ignition coil means, means connecting said spark gap means to said ignition coil means, controlled rectifier means having an anode and a cathode and a gate junction, means connecting said anode of said controlled rectifier means to said ignition coil means, inductance means connecting said cathode of said controlled rectifier means to said source of direct current energy, switch means connecting said gate junction of said controlled rectifier means to said source of direct current energy biasing said controlled rectifier means to conduction producing a magnetic field in said ignition coil means, rotary capacitor means having rotor plates and stator plates, said rotor plates displaced with respect to said stator plates by said internal combustion mechanism, means electrically connecting said rotary capacitor means to said source of direct current energy and to said anode of said controlled rectifier means, the capacitance of said rotary capacitor means alternately changing from a maximum capacitance value to a minimum capacitance value with rotation of said rotor plates, said capacitance means having a maximum impedance which is substantially equal to the impedance of said inductance means, said rotary capacitor means and said inductance means cooperating to apply a determined value of reverse voltage across said controlled rectifier means when said capacitance value of said rotary capacitor means is maximum biasing said controlled rectifier means to nonconduction causing a collapse of said magnetic field producing a high voltage in said ignition coil means causing a spark across said spark gap means.

20. In an ignition apparatus for an internal combustion engine mechanism having a source of direct current energy, spark gap means, ignition coil means, means connecting said spark gap means to said ignition coil means, controlled rectifier means having an anode and a cathode and a gate junction, means connecting said anode of said controlled rectifier means to said ignition coil means, inductance means connecting said cathode of said controlled rectifier means to said source of direct current energy, switch means connecting said gate junction of said controlled rectifier means to said source of direct current energy biasing said controlled rectifier means to conduction producing a magnetic field in said ignition coil means, rotary capacitor means having rotor plates interleaved with stator plates, said rotor plates displaced with respect to said stator plates by said internal combustion mechanism, means electrically connecting said rotary capacitor means to said source of direct current energy and to said anode of said controlled rectifier means, the capacitance of said rotary capacitor means alternately changing from a maximum capacitance value to a minimum capacitance value with rotation of said rotor plates, said capacitance means having a maximum impedance which is substantially equal to the impedance of said inductance means, said rotary capacitor means and said inductance means developing an oscillatory current so that a determined value of reverse voltage is applied across said controlled rectifier means when said capacitance value of said rotary capacitor means is maximum biasing said controlled rectifier means to nonconduction causing a collapse of said magnetic field producing a high voltage in said ignition coil means causing a spark across said spark gap means.

21. In an ignition apparatus for an internal combustion engine having a source of direct current energy, spark gap means, ignition coil means, means connecting said spark gap means to said ignition coil means, controlled rectifier means having an anode and a cathode and a gate junction, means connecting said anode of said controlled rectifier means to said ignition coil means, semiconductor means connecting said cathode of said controlled rectifier means to said source of direct current energy, means connecting said gate junction of said controlled rectifier means to said semiconductor means, rotary capacitor means having rotor plates interleaved with stator plates, said rotor plates displaced with respect to said stator plates by said internal combustion mechanism, means electrically connecting said rotary capacitor means to said source of direct current energy and to said semiconductor means, the capacitance of said rotary capacitor means alternately changing from a maximum capacitance value to a minimum capacitance value with rotation of said rotor plates, said maximum capacitance value biasing said semiconductor means to conduction causing said controlled rectifier means to be biased to conduction allowing current to flow through said ignition coil means producing a magnetic field therein, said minimum capacitance value biasing said semiconductor means to nonconduction causing said controlled rectifier means to be biased to nonconduction causing a collapse of said magnetic field producing a high voltage in said ignition coil means causing a spark across said spark gap means.

22. In an ignition apparatus for an internal combustion engine having a source of direct current energy, spark gap means, ignition coil means, means connecting said spark gap means to said ignition coil means, controlled rectifier means having an anode and a cathode and a gate junction, means connecting said anode of said controlled rectifier means to said ignition coil means, cascaded semiconductor means connecting said cathode of said controlled rectifier means to said source of direct current energy, means connecting said gate junction of said controlled rectifier means to said cascaded semiconductor means, rotary capacitor means having rotor plates interleaved with stator plates, said rotor plates displaced with respect to said stator plates by said internal combustion mechanism, means electrically connecting said rotary capacitor means to said source of direct current energy and to said cascaded semiconductor means, the capacitance of said rotary capacitor means alternately changing from a maximum capacitance value to a minimum capacitance value with rotation of said rotor plates, said maximum capacitance value biasing said cascaded semiconductor means to conduction causing said controlled rectifier means to be biased to conduction allowing current to flow through said ignition coil means producing a magnetic field therein, said minimum capacitance value biasing said cascaded semiconductor means to nonconduction causing said controlled rectifier means to be biased to nonconduction causing a collapse of said magnetic field producing a high voltage in said ignition coil means causing a spark across said spark gap means.

23. In an ignition apparatus for an internal combustion engine having a source of direct current energy, spark gap means, ignition coil means, means connecting said spark gap means to said ignition coil means, controlled rectifier means having an anode and a cathode and a gate junction, means connecting said anode of said controlled rectifier means to said ignition coil means, cascaded transistor means connecting said cathode of said controlled rectifier means to said source of direct current energy, means connecting said gate junction of said controlled rectifier means to said cascaded transistor means, rotary capacitor means having rotor plates interleaved with stator plates, said rotor plates displaced with respect to said stator plates by said internal combustion mechanism, means electrically connecting said rotary capacitor means to said source of direct current energy and to said cascaded transistor means, the capacitance of said rotary capacitor means alternately changing from a maximum capacitance value to a minimum capacitance value with rotation of said rotor plates, said maximum capacitance value biasing said cascaded transistor means to conduction in sequence causing said controlled rectifier means to be biased to conduction allowing current to flow through said ignition coil means producing a magnetic field therein, said minimum capacitance value biasing said cascaded transistor means to nonconduction causing said controlled rectifier means to be biased to nonconduction causing a collapse of said magnetic field producing a high voltage in said ignition coil means causing a spark across said spark gap means.

(References on following page)

References Cited

UNITED STATES PATENTS

| | | | |
|---|---|---|---|
| 3,223,887 | 12/1965 | Brown | 315—223 |
| 3,297,911 | 1/1967 | Quinn | 315—214 |
| 3,018,392 | 1/1962 | Jones et al. | 307—88.5 |
| 3,045,148 | 7/1962 | McNulty et al. | 315—183 |
| 3,184,653 | 5/1965 | Hutson | 315—209 X |
| 3,240,198 | 3/1966 | Loudon et al. | 123—148 |

OTHER REFERENCES

Solid State Products, July 1961, pp. 1 and 2.

IBM Technical Disclosure Bulletin, vol. 3, No. 6, November 1960, pp. 44, 45.

IBM Technical Disclosure Bulletin, vol. 4, No. 9, February 1962, pp. 54, 55.

JOHN W. HUCKERT, *Primary Examiner.*

JERRY D. CRAIG, *Assistant Examiner.*

U.S. Cl. X.R.

148—123; 315—290, 221, 223, 240; 317—235